B. W. JONES.
MOTOR CONTROL SYSTEM.
APPLICATION FILED FEB. 4, 1918.

1,315,774.

Patented Sept. 9, 1919.

Inventor:
Benjamin W. Jones,
by Albert G. Davis
His Attorney.

;# UNITED STATES PATENT OFFICE.

BENJAMIN WALTON JONES, OF SCHENECTADY, NEW YORK, ASSIGNOR TO GENERAL ELECTRIC COMPANY, A CORPORATION OF NEW YORK.

MOTOR-CONTROL SYSTEM.

1,315,774.      Specification of Letters Patent.      Patented Sept. 9, 1919.

Application filed February 4, 1918. Serial No. 215,306.

*To all whom it may concern:*

Be it known that I, BENJAMIN W. JONES, a citizen of the United States, residing at Schenectady, county of Schenectady, State of New York, have invented certain new and useful Improvements in Motor-Control Systems, of which the following is a specification.

My invention relates to motor control and has for its object an improved system of starting and stopping and generally effecting the control of an electric motor.

More specifically my invention relates to the control of series motors intended for service requiring frequent reversals. The retardation of series motors by dynamic braking has always been troublesome by reason of the difficulty in maintaining the strength and polarity of the series field. The difficulty is more pronounced in the case of a reversing equipment where the reversals are frequent and hence the dynamic braking action must effect a quick stop from either direction of rotation. In carrying out my invention I provide means whereby the direction of current through the field windings of the motor is always maintained while the direction of current through the armature is reversed. In one form of my invention I provide an arrangement whereby when the controller is thrown to the "off" or neutral position, the reverse connections of the armature are made and a dynamic braking circuit established, while the polarity of the field remains unchanged. In other words, at the "off" position of the controller, the armature connections will depend upon the direction in which the controller was last moved. If, for instance, the controller is moved to the "off" position from a "forward" position the "reverse" connections of the armature will be established, and likewise, if the controller is moved to the "off" position from the "reverse" position, the "forward" connections of the armature will be established. The flow of current through the field winding is, however, always in the same direction. In order to insure that the field shall build up quickly, I maintain a connection between the field and line during the braking period but insert a high resistance in the connection so as not to affect the operation during braking. The result is that an effective braking action is obtained in the "off" position of the controller regardless of the direction in which the armature was rotating.

Figure 1:
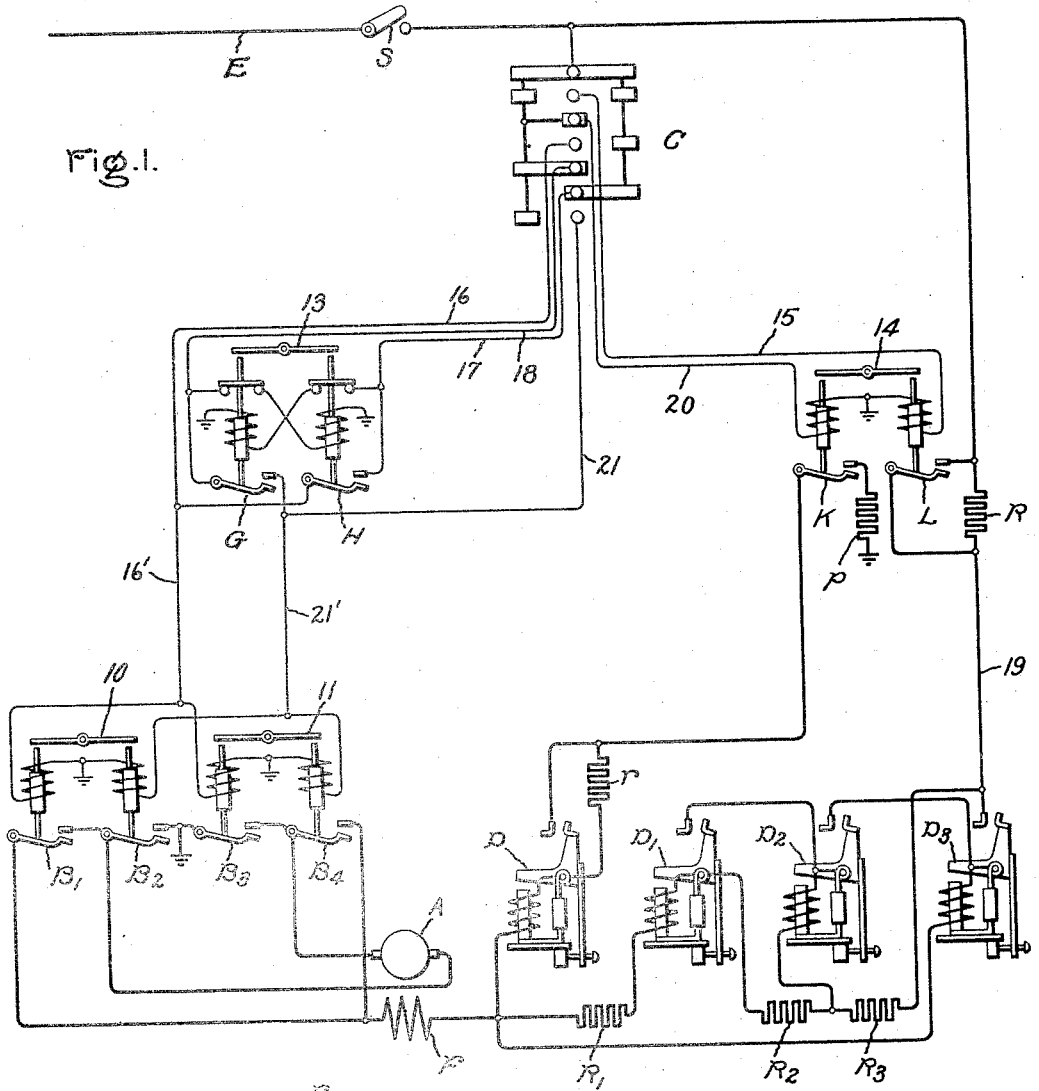
Figure 2:
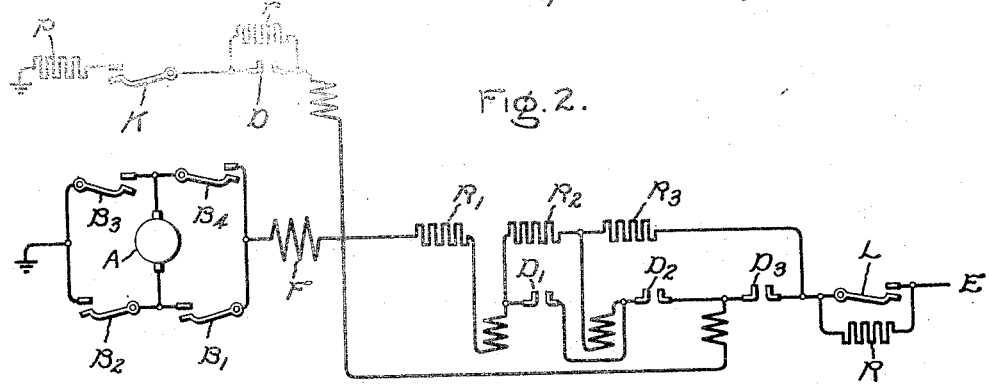

For a more exact understanding of the nature and objects of this invention reference should be had to the following detailed description when taken in connection with the accompanying drawing in which Figure 1 shows, in diagrammatic fashion, a system of motor control embodying my invention, while Fig. 2 is a simplified diagram of the motor connection shown in Fig. 1.

Referring now to the drawing, A denotes the armature of the motor to be controlled, and F denotes its field. The connections of the armature with the field are made by the electromagnetic switches or contactors $B_1$, $B_2$, $B_3$ and $B_4$. These contactors are provided with interlocking means which permits but two to be closed at one time; that shown being a mechanical interlocking means comprising the pivoted bars 10 and 11, the bar 10 coöperating with the upper ends of the plungers of contactors $B_1$ and $B_2$, the bar 11 coöperating with the contactors $B_3$ and $B_4$.

The motor circuit is also provided with the accelerating contactors $D_1$, $D_2$ and $D_3$, which are arranged to successively short circuit the resistances $R_1$, $R_2$ and $R_3$, cutting them out of the motor circuit.

All of these contactors are arranged to be under the control of the master switch or controller C; as are also the braking relays G and H and the running relays K and L.

The braking relays G and H are connected in the operating circuits between the controller C and the contactors $B_1$, $B_2$, $B_3$ and $B_4$ so that, when the controller is moved from either running position to the "off" or stopped position, the connections of the armature A with the field F are reversed and the motor automatically becomes a braking generator. The relays G and H are preferably equipped with interlocking means; that shown also being a mechanical one comprising the pivoted bar 13 coöperating with the plungers of the relays.

The running relays K and L are under the direct control of the controller C. The relay K is arranged to complete a local circuit, here shown as a connection to ground in parallel with the armature A and field F which includes the resistance P, for converting the motor into a braking generator.

The relay L on the other hand is arranged to short circuit the resistance R, cutting it out of the motor circuit when in service operation. This arrangement requires that relay L shall be energized while the controller is in either forward or reverse position, and that relay H or relay G (depending upon which way the controller has been moved) shall be energized while the controller is in neutral position, the line switch S being closed to supply the energizing current.

I have also provided relays K and L with interlocking means, here shown as a mechanical interlock comprising the pivoted bar 14 coöperating with the plungers of these relays.

The local circuit of the braking generator is here shown as provided with an accelerating contactor D to short circuit the resistance $r$ out of the local circuit when the current of the braking generator has attained sufficient strength, but obviously the use of an accelerating contactor in the local circuit of the braking generator is not required in the practice of my invention.

The mode of operation of my invention is as follows:

Assuming that switch S has been closed and the controller C makes contact along the right-hand row of segments, current would then flow from the line E through the controller and the conductor 15 to energize the relay L for short circuiting the resistance R, thence the current flows to ground. Current would also flow from the line E through the controller and conductors 16 and 16' to energize the parallel controlled contactors $B_1$ and $B_3$ for completing the motor circuit, and thence the current flows to ground.

When the motor circuit has been completed by the closing of contactors $B_1$ and $B_3$, current will flow from the line E through resistance $R_3$ and $R_2$ by way of conductor 19, then successively through the winding of switch D', resistance R', thence to the field F, the armature A, and finally to ground by way of contactors $B_1$ and $B_3$. The accelerating contactors $D_1$, $D_2$ and $D_3$ will now be successively energized to cut out the resistances $R_2$, $R_1$ and $R_3$ respectively in a well known manner, thereby permitting the motor to accelerate to full load running condition.

In addition to the currents flowing through the controller C by way of conductors 15 and 16, current will also flow through the controller by way of conductor 17, conductor 18 being dead in this position of the controller. The current in conductor 17 will energize relay G for closing a circuit preparatory to the dynamic braking operation.

Assuming now that it is desired to stop the motor, the controller C would be moved to the "off" position which corresponds with that shown in the drawing. In this position relay L is deënergized, current now flowing from the line E, through the controller and conductor 20 to energize relay K for completing the local circuit of the braking generator, and thence this current flows to ground. In the "off" position conductor 18 is put in conducting relation with the line E, so that current now traverses it, flowing thence to conductor 21' by way of the switch previously closed by relay G. From conductor 21' the current energizes the parallel controlled contactors $B_2$ and $B_4$ and then flows to ground.

As soon as contactors $B_1$ and $B_3$ open, the contactors $B_2$ and $B_4$ may close, thus connecting the motor through a local circuit including the field F and the resistances $r$ and P, to convert the motor into a braking generator.

The resistance R having been inserted in the motor circuit by the opening of relay L, it is seen that a relatively small current will now flow from the line E through the field F and thence to ground, thereby insuring the same polarity to the field that it had when the dynamo machine was running as a motor. The counter E. M. F. will accordingly build up in the same direction as when the dynamo machine was a motor, which counter E. M. F. will cause a current to flow producing a counter torque that will brake the motor.

The armature and field connections having been reversed this counter current now flowing in the local circuit will not interfere with the field excitation, but will assist it, thereby producing an increased braking effect which quickly brings the motor to rest.

The accelerating contactor D will short circuit resistance $r$ out of the local circuit in the usual manner, permitting the counter current further to increase and apply still more counter torque thereby producing a powerful braking effect without an initial rush of counter current which would produce only a heating effect.

When the controller C is subsequently moved to make contact along the left-hand row of contracts, current would flow from line E to energize relay L for short circuiting resistance R in the same manner as above described, the movement of the controller deënergizing the relay K. The holding circuit for the relay G including conductor 17 is also deënergized by this movement of the controller. Relay G consequently drops open and completes a holding circuit for relay H, permitting current to flow from the line E through the controller and conductor 18 to energize relay H preparatory to another braking operation; thence this current flows to ground.

It is now seen that a motor circuit is established from the line E about resistance R by way of conductor 19 for running the motor in service operation as before described, but in a reversed direction.

While I have here shown an embodiment of my invention which is, at present, the best means known to me for carrying the same into effect, I would have it understood that this is merely illustrative and that I do not mean to be limited thereby to the precise details here disclosed since obvious alterations thereof will appear to those skilled in this art, nor in the choice of recognized equivalents except as defined in my claims hereunto annexed.

What I claim as new and desire to secure by Letters Patent of the United States, is,—

1. In a system of motor control, the combination with a series motor and a controller for reversing the same, of means whereby a dynamic braking circuit is established and the direction of the current through the field winding is maintained when the controller is moved from either position to the off position.

2. In a system of motor control, the combination with a series motor and a controller for reversing the same, of means whereby when the controller is moved from either position to the other position a dynamic braking circuit is established and the direction of the current through the field windings maintained in passing through the neutral position.

3. In a system of motor control, the combination with a series motor and electromagnetic reversing switches therefor, of a reversing master controller for said switches, and means whereby when the master controller is moved from one operative position to the off position the reversing switches for the opposite direction of rotation will be closed and a dynamic braking circuit established with the direction of current through the field windings maintained.

4. In a system of motor control, the combination with a series motor and a controller for reversing the same, of means whereby when the controller is moved from either position to the off position the armature connections are reversed with reference to those established when the controller is moved from the other position and a dynamic braking circuit established with the direction of current through the field windings maintained.

5. In a system of motor control, the combination with a dynamo-electric machine having an armature and series field, reversing means therefor, connections whereby a closed local circuit is established through the field and armature to produce a dynamic braking effect and a high resistance connection established for energizing the field during braking to insure the rapid building up of the field.

6. In a system of motor control, the combination with a series motor, of a reversing controller therefor, connections whereby a closed local circuit is established through the field and armature of said motor to produce a dynamic braking effect when the controller is moved toward the reverse position and a high resistance connection established for energizing the field during braking to insure the rapid building up of the field.

7. In a system of motor control, the combination with a series motor, of a reversing controller therefor, connections whereby a closed local circuit is established through the armature and field of the motor when the controller is moved toward the reverse position and the line connection maintained through a high resistance.

8. In a system of motor control, the combination with a dynamo-electric machine having an armature and series field, of reversible connections between said armature and field, an open-circuited connection in parallel with said armature and field, a controller therefor, and means for reversing said armature connections and closing the circuit of said parallel connection when said controller is moved to "off" position.

9. In a system of motor control, the combination with a dynamo-electric machine having an armature and series field, of reversible connections between said armature and field, an open-circuited connection in parallel with said armature and field, a controller therefor, automatic means for reversing said armature connections and closing the circuit of said parallel connection when said controller is moved to "off" position, and means for insuring the correct polarity of said field during braking operation.

10. In a system of motor control, the combination with a dynamo-electric machine having an armature and series field, of reversible connections between said armature and field, an open-circuited connection in parallel with said armature and field, a controller therefor, automatic means for reversing said armature connections and closing the circuit of said parallel connection when said controller is moved to "off" position, and means for inserting a resistance between the source of electric supply and said field during braking operation.

11. In a system of motor control, the combination with a dynamo-electric machine having an armature and series field, of reversible connections between said armature and field, an open-circuited connection in parallel with said armature and field, a controller therefor, interlocked means for reversing said armature connections, and interlocked means for closing the circuit of said parallel connection and inserting a resistance between the source of electric supply and said field, both said means being actuated when the controller is moved to "off" position.

12. In a system of motor control, the combination with a dynamo-electric machine having an armature and series field, of reversible connections between said armature and field, an open-circuited connection in parallel with said armature and field, a controller therefor, electro-magnetic switches for reversing said armature connections, electromagnetic switches for closing the circuit of said parallel connection and inserting a resistance between the source of electric supply and said field, said switches being arranged to be actuated by said controller when moved to "off" position.

13. In a system of motor control, the combination with a dynamo-electric machine having an armature and series field, of reversible connections between said armature and field, an open-circuited connection in parallel with said armature and field, a controller therefor, electromagnetic contactors for reversing said armature connections arranged to be directly actuated by said controller, relays adapted to actuate said contactors preparatory to braking operation, and a switch for closing the circuit of said parallel connection, said relays and switch being arranged to be actuated by said controller when moved to "off" position.

14. In a system of motor control, the combination with a dynamo-electric machine having an armature and series field, of reversible connections between said armature and field, an open-circuited connection in parallel with said armature and field, a controller therefor, interlocked electromagnetic contactors for reversing said armature connections arranged to be directly actuated by said controller, electromagnetic relays adapted to actuate said contactors preparatory to braking operation, and electromagnetic switches for closing the circuit of said parallel connection and inserting a resistance between the source of electric supply and said field, said relays and switches being arranged to be actuated by said controller when moved to "off" position.

15. In a system of motor control, the combination with a dynamo-electric machine having an armature and series field, of reversible connections between said armature and field, an open-circuited connection in parallel with said armature and field, a controller therefor, accelerating electromagnetic contactors in the motor circuit arranged to be actuated by the motor current, interlocked electromagnetic contactors for reversing said armature connections arranged to be directly actuated by said controller, electromagnetic relays adapted to actuate said contactors preparatory to braking operation, and electromagnetic switches for closing the circuit of said parallel connection and inserting a resistance between the source of electric supply and said field, said relays and switches being arranged to be actuated by said controller when moved to "off" position.

In witness whereof, I have hereunto set my hand this 2nd day of February, 1918.

BENJAMIN WALTON JONES.